Patented Jan. 13, 1953

2,625,553

UNITED STATES PATENT OFFICE 2,625,553

HALOALKYLATION OF THIOPHENES

Herman Pines, Chicago, and Jerome A. Vesely, Evanston, Ill., assignors to Universal Oil Products Company, Chicago, Ill., a corporation of Delaware No Drawing. Application October 30, 1947,
Serial No. 783,222

3 Claims. (Cl. 260—332.5)

This invention relates to the haloalkylation of thiophenes. It is more particularly concerned with the catalytic production of chloroalkyl and bromoalkyl thiophenes.

In one embodiment our invention relates to a haloalkylation process which comprises contacting a diene, a haloalkylatable thiophene, and a hydrogen halide having a molecular weight between 35 and 82 with a haloalkylation catalyst at haloalkylating conditions.

In a more specific embodiment our invention relates to a haloalkylation process which comprises reacting a diene containing a tertiary and a nontertiary double bond, a thiophene containing a substitutable hydrogen atom attached to a carbon atom of the ring, and a hydrogen halide having a molecular weight between 35 and 82, in the presence of a haloalkylation catalyst at a haloalkylation temperature below about 200° C. and a pressure sufficient to maintain a substantial portion of the reactants in the liquid phase.

A thiophene that is convertible into a haloalkylthiophene by our process contains at least one hydrogen atom bound to the heterocyclic ring of 4 carbon atoms and 1 sulfur atom. The different haloalkylatable thiophenes may be represented by the formula:

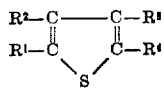

in which at least one of the groups $R^1$, $R^2$, $R^3$, and $R^4$ is a hydrogen atom and the other R groups are selected from the group consisting of hydrogen, alkyl, aryl, aralkyl, alkaryl, naphthol, F, Cl, Br, I $NO_2$, $NH_2$, OH, SH, $SO_3H$, and $SO_2H$ radicals.

The dienes used in our process may be conjugated or nonconjugated and may be either of the open chain or of the closed chain variety, i. e., alkadienes or cycloalkadienes. A preferred type of diene is one in which only one of the double bonds is attached to a tertiary carbon atom, that is, dienes containing a tertiary and a nontertiary double bond. Examples of the various dienes that may be used in our process include butadiene, isoprene, 2-methyl-1,3-pentadiene, 3-ethyl-1,3-heptadiene, and 2-methyl-1,3-cyclohexadiene.

The hydrogen halides having molecular weights between 35 and 82 that are used in our process comprise hydrogen chloride and hydrogen bromide. These materials should be substantially anhydrous.

The catalysts that may be used in our process comprise those acid acting substances that promote the reaction of dienes, thiophenes, and either hydrogen chloride or hydrogen bromide to produce the corresponding haloalkylthiophenes. Acid acting phosphorous-containing catalysts are one of the preferred types of catalyst. Materials of this type include the acids of pentavalent phosphorous, particularly the ortho, pyro, and tetra types, although other acids of phosphorous may be used. These acids may be used in their concentrated form containing up to about 25% of water or they may be deposited upon adsorbents or carriers of a predominantly siliceous nature such as diatomaceous earth, kieselguhr, and artificially prepared silica, or materials of the class of aluminum silicates such as fuller's earth, bentonite, montmorillonite, and acid treated clays. Various other phosphorous containing catalysts include heteropoly acids such as phosphotungstic and phosphomolybdic; alkaline earth phosphates such as the dihydrophosphates of calcium, strontium and barium; cupric orthophosphate or a material formed by calcining hydrated cupric orthophosphate at a temperature within the range of from about 200° to about 400° C; and a salt or an acid salt of an acid of phosphorous and a material selected from the members of the right hand column of group II of the periodic table. A particularly active catalyst comprises a liquid mixture of phosphoric and sulfuric acids containing less than about 80% sulfuric acid.

Another group of haloalkylation catalysts comprises silica and at least one other metal oxide promoter such as alumina, zirconia, magnesia and the like. These catalysts may be prepared in any suitable manner including separate, successive, and coprecipitation methods. In some cases naturally occurring metal oxides such as montmorillonite or acid treated montmorillonite may be employed.

Various other haloalkylation catalysts such as boron fluoride, boron fluoride-ethyl etherate, monomethanolate, aluminum chloride, methylate and the like, may be employed in our process.

The process of our invention may be carried out in batch operation by placing a quantity of a catalyst and a thiophene in a reactor equipped with a stirring device. An excess of the hydrogen halide is then added to the reactor after which the diene is added over a period of time. After the haloalkylation reaction has reached the desired degree of completion, the resultant reaction mixture is then removed from the reactor and the desired products recovered therefrom.

The preferred method of operation is of the continuous type. If the condensation catalyst is liquid, it is continuously charged to the reactor together with the thiophene, the diene, and the hydrogen halide. The reactor effluent is passed to a settler wherein a separation is effected between the catalyst phase and the thiophene phase, and at least a portion of the catalyst phase is continuously recycled to the reaction zone. The thiophene phase is processed for recovery of the desired products and unconverted thiophene and hydrogen halide may be recycled to the reactor. If the catalyst is a solid, it may be disposed as a fixed bed within a reactor and the reactants continuously passed through the bed at haloalkylation conditions. The haloalkyl thiophene in the effluent is recovered and the unreacted materials may be recycled to the reaction zone. Fluidized and moving bed types of operation also may be employed with the solid catalysts.

The process of this invention may be conducted at temperatures within the range of from about −20° C. to about 200° C. The preferred temperature will depend upon the particular thiophene and diene being charged to the process and upon the activity of the particular catalyst being employed. When very active catalysts, such as phosphoric acid-sulfuric acid mixtures are used, lower temperatures are preferred in order to avoid decomposition and other undesirable reaction; when less active catalysts such as those of the metal type oxide are employed, higher temperatures must be used in order to have a reasonable rate of reaction.

It is preferred to operate with a substantial portion of the reactants in the liquid phase. Therefore the pressure should be chosen accordingly.

The contact time is not particularly critical, but is usually within the range from about three minutes to about three hours.

A molecular excess of the thiophene over the diene in the reaction zone promotes haloalkylation and tends to suppress undesirable side reactions such as polymerization.

Best results usually are obtained when an excess of the hydrogen halide is maintained in the reaction zone, i. e., more than the amount of hydrogen halide required to add to one of the double bonds of the diene.

The following example is given to illustrate our invention, but it is not introduced with the intention of unduly limiting the generally broad scope of said invention.

Example I

Thiophene and 85% orthophosphoric acid were placed in a 250 cc. alkylation flask which was surrounded by an ice bath. The mixture was stirred and hydrogen chloride was introduced through the bottom inlet tube of the flask. When the catalyst-thiophene mixture was saturated with hydrogen chloride, isoprene addition was begun. An excess of hydrogen chloride was passed through the reaction mixture while the addition of the alkadiene was taking place. The product was separated from the catalyst, washed and distilled.

Reagents used:
Thiophene _____ 42 g. (0.5 m).
Isoprene _____ 17 g. (0.25 m).
Phosphoric acid (85%) ____ 17.3 g. (10.5 cc).
Conditions _____ 5–25° C.
Time _____ 2.5 hours.

The principal product resulting from this reaction consisted of chloropentyl thiophene which amounted to over 25 mol per cent based on the isoprene charged. This compound had a boiling point of 65° C. at 1.5 mm. of mercury pressure and had a refractive index, $n_D^{20}$, of 1.5200. The theoretical and actual analyses are shown below:

Analysis:
Calcd. for $C_9H_{13}SCl$____ S=17.02, Cl=18.62
Found _____ S=17.00, Cl=19.17

We claim as our invention:

1. A haloalkylation process which comprises reacting a diene, a thiophene containing a substitutable hydrogen atom attached to a carbon atom of the ring, and a hydrogen halide selected from the group consisting of hydrogen chloride and hydogen bromide, in the presence of an acid-acting haloalkylation catalyst at a reaction temperature between about −20° C. and about 200° C. and a pressure sufficient to maintain a substantial portion of the reactants in the liquid phase.

2. A haloalkylation process which comprises reacting a diene containing a tertiary and a nontertiary double bond, a thiophene containing a substitutable hydrogen atom attached to a carbon atom of the ring, and a hydrogen halide selected from the group consisting of hydrogen chloride and hydrogen bromide, in the presence of an acid-acting haoalkylation catalyst at a reaction temperature between about −20° C. and about 200° C. and a pressure sufficient to maintain a substanital portion of the reactants in the liquid phase.

3. A process for the production of chloropentylthiophene which comprises reacting isoprene, thiophene, and hydrogen chloride in the presence of ortho phosphoric acid at a reaction temperature between about −20° C. and 200° C. and a pressure sufficient to maintain a substantial portion of the reactants in the liquid phase.

HERMAN PINES.
JEROME A. VESELY.

REFERENCES CITED

The following references are of record in the file of this patent:

UNITED STATES PATENTS

| Number | Name | Date |
|---|---|---|
| 2,141,611 | Malishev | Dec. 27, 1938 |

OTHER REFERENCES

Gilman: "Organic Chemistry," ed. 2, p. 638, vol. 1, Wiley, N. Y., 1943.